Oct. 15, 1963  E. HEPPERLE  3,106,865
LOADING DEVICE FOR AUTOMATIC FIREARMS HAVING A REVOLVER DRUM
Filed June 16, 1960  4 Sheets-Sheet 2
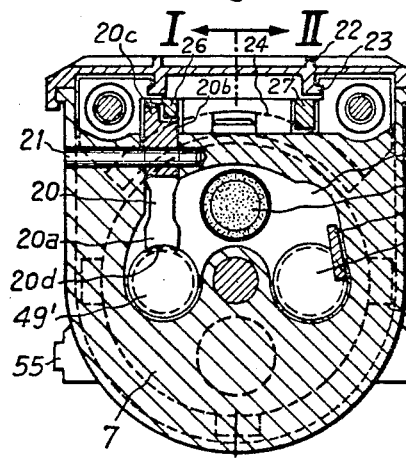
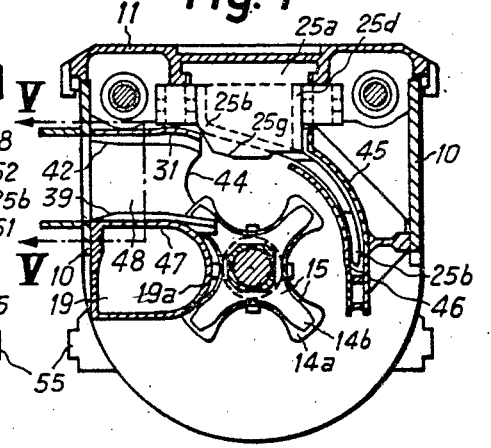
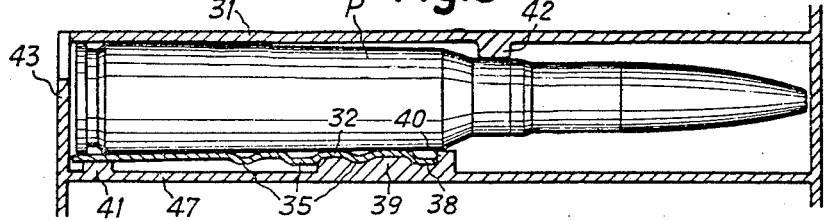
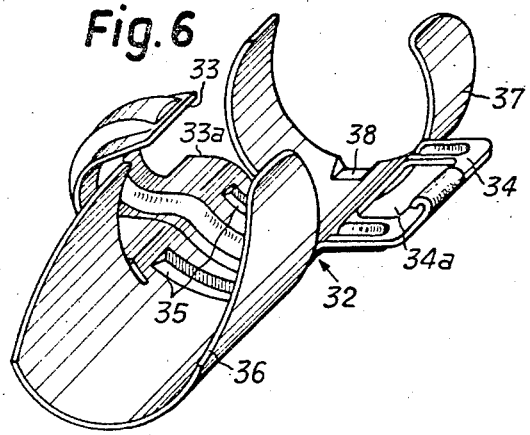
Inventor
Erwin Hepperle
By
Wenderoth, Lind & Ponack
Attorneys Oct. 15, 1963 E. HEPPERLE 3,106,865
LOADING DEVICE FOR AUTOMATIC FIREARMS HAVING A REVOLVER DRUM
Filed June 16, 1960 4 Sheets-Sheet 3

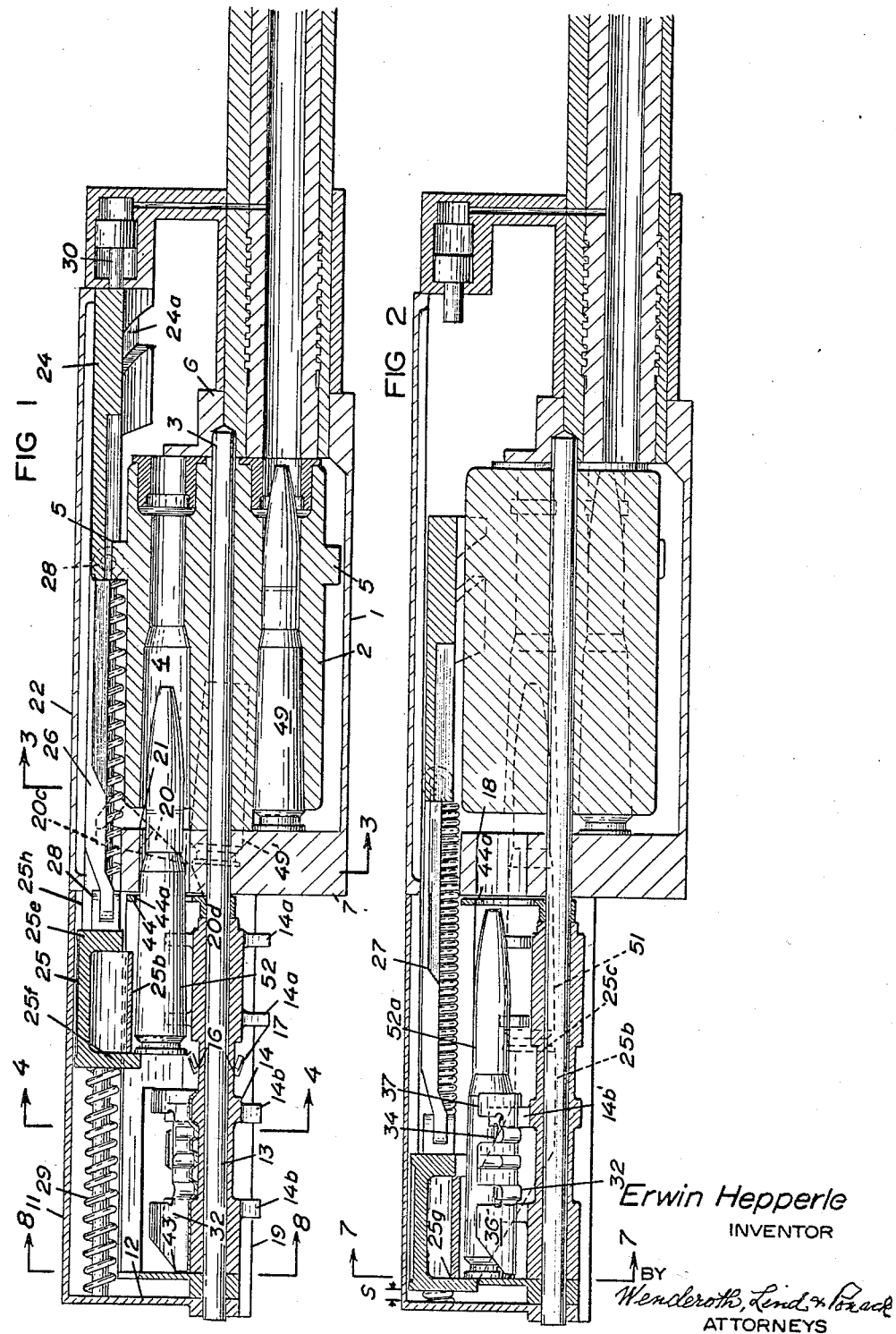

Inventor
Erwin Hepperle
By Wenderoth, Lind & Ponack
Attorneys

Oct. 15, 1963 E. HEPPERLE 3,106,865
LOADING DEVICE FOR AUTOMATIC FIREARMS HAVING A REVOLVER DRUM
Filed June 16, 1960 4 Sheets-Sheet 4
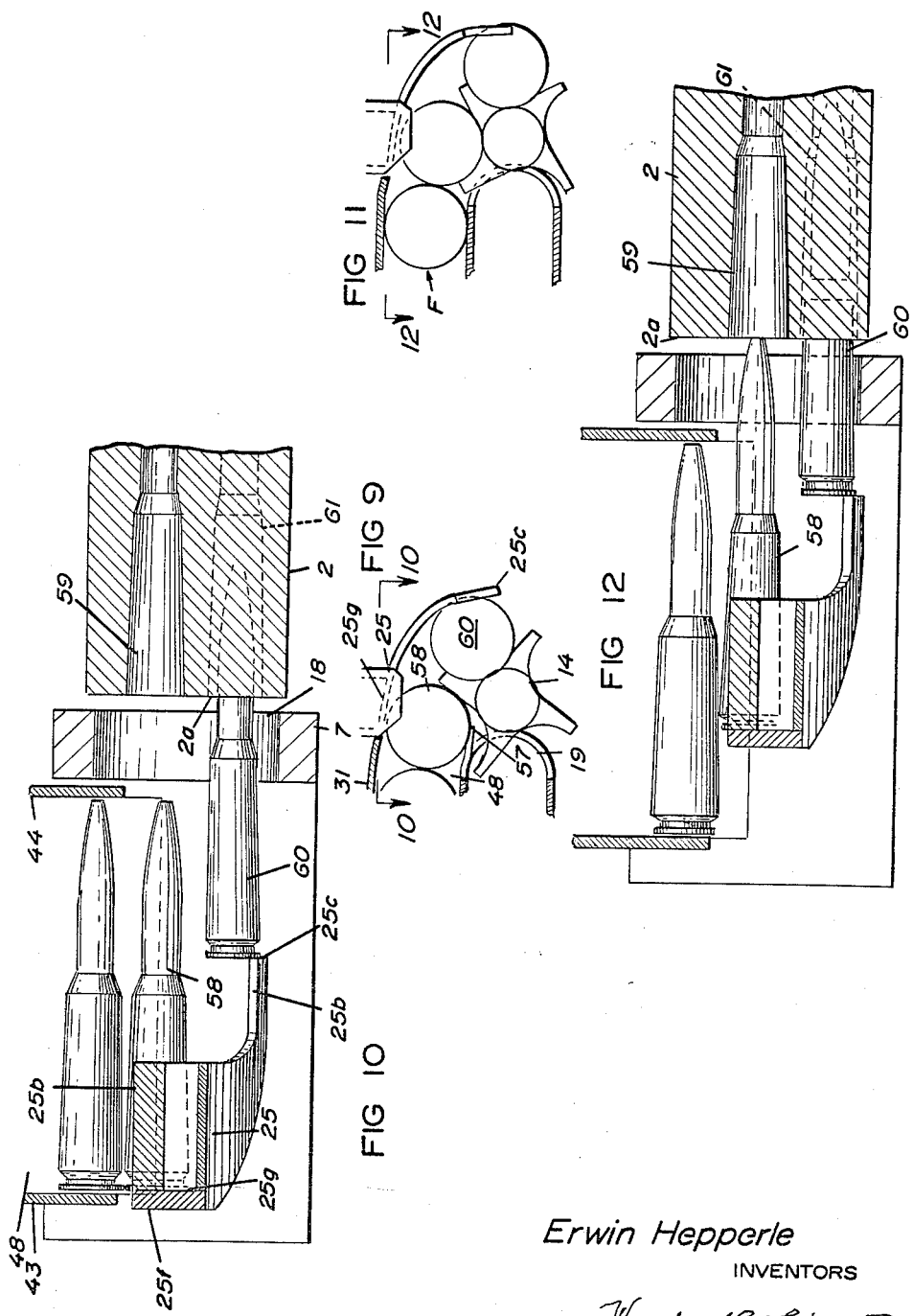
Erwin Hepperle
INVENTORS
BY Wenderoth, Lind & Ponack
ATTORNEYS United States Patent Office 3,106,865
Patented Oct. 15, 1963

3,106,865
LOADING DEVICE FOR AUTOMATIC FIREARMS HAVING A REVOLVER DRUM
Erwin Hepperle, Dietlikon, Zurich-Eichelacker, Switzerland, assignor to Machine Tool Works Oerlikon Administration Company, Zurich-Oerlikon, Switzerland
Filed June 16, 1960, Ser. No. 36,518
Claims priority, application Switzerland June 18, 1959
2 Claims. (Cl. 89—33)

The present invention relates to a loading device for an automatic firearm having a revolver drum containing several cartridge chambers as used as an armament for combat aircraft.

It has the principal object of reducing the weight and space occupied by such an automatic firearm. More particularly it has the object of reducing the number of cartridge chambers in the said revolver drum as required for continuous firing, and thereby reducing the diameter of said drum and hence the bulk and weight of the firearm as a whole.

With these and other objects in view which will become apparent later from this specification and the accompanying drawings I provide a loading device for an automatic firearm comprising in combination: a revolver drum containing several cartridge chambers, star-shaped feeder wheel having recesses co-axial with the said cartridge chambers, a shaft common to the said drum and feeder wheel and fixedly connected to both, a cartridge feeder channel directed transversely of the axis of said shaft towards the said feeder wheel, the cartridges being moved in operation individually in succession into the said recesses, and a feeder slide reciprocatable in a direction parallel to the said axis, the said feeder slide in a first feeder stroke engaging a cartridge emerging from said feeder channel and transferring it into a position co-axial with one of the said recesses of said feeder wheel, and in a consecutive feeder stroke pushing said cartridge into the cartridge chamber of the said revolver drum aligned with said recess. Preferably the axis of the cartridge is positioned eccentrically of the axis of the said cartridge chamber up to near the end of the said first feeder stroke of the said feeder slide.

In former loading devices the cartridges were pushed by a feeder member towards a cartridge chamber in the revolver drum only when lying co-axially with said cartridge chamber in a recess of said feeder wheel, and accordingly at least five cartridge chambers were required for continuous firing of a weapon having a single barrel, if the axial feed had to be performed in two feeder strokes of the feeder member.

The present invention makes it possible to reduce the number of cartridge chambers in the revolver drawn by one unit, i.e., to four in a weapon having a single barrel.

These and other features of my said invention will be clearly understood from the following description of a preferred embodiment and a modification thereof, given by way of example with reference to the accompanying drawings, in which:

FIG. 1 is a longitudinal section of a revolver gun on the line I—I of FIG. 3, with the slide in the forward end position;

FIG. 2 is a longitudinal section on the line II—II of FIG. 3 illustrated at the beginning of the feeder movement of the slide;

FIG. 3 is a cross section on the line III—III of FIG. 1;

FIG. 4 is a cross section on the line IV—IV of FIG. 1, illustrated without a cartridge belt;

FIG. 5 is a section through the feeder channel on line V—V of FIG. 4, illustrated with a cartridge belt;

FIG. 6 is a perspective view of a belt link;

FIGS. 9 to 12 show a second embodiment of the feeder device suitable for cartridges not arranged in a belt, namely:

FIGS. 9 and 11 are sections on the line VIII—VIII of FIG. 1 for two different operational positions;

FIG. 10 is a diagrammatic illustration of a section on line X—X of FIG. 9;

FIG. 12 is a digrammatic illustration corresponding to FIG. 10 in section on line XII—XII of FIG. 11.

Figure 7:
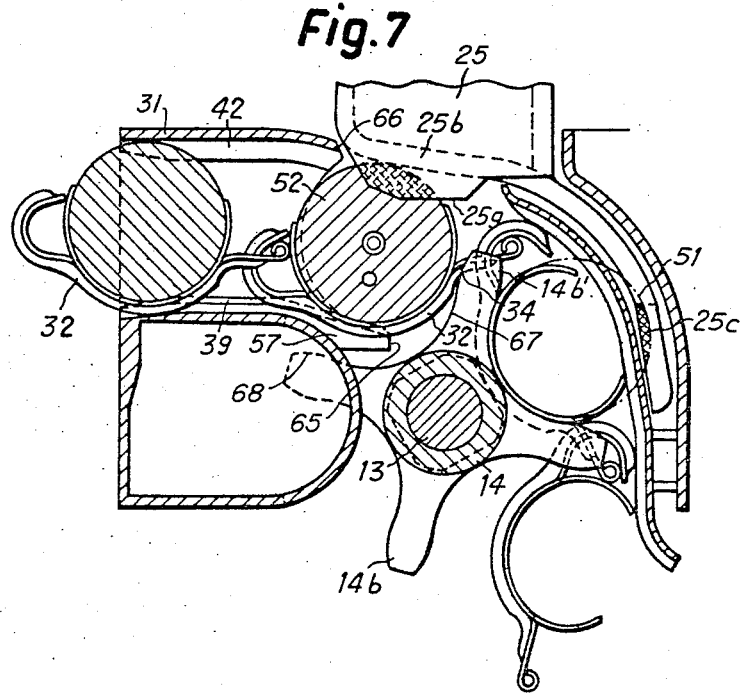
FIG. 7 is a section on the line VII—VII of FIG. 2.

According to FIG. 1 the shaft 3 keyed to the revolver drum 2 is journalled in the front wall 6 and in the rear wall 7 of the trough-shaped casing 1 of the weapon. The revolver drum 2 contains four cartridge chambers 4 arranged at even angular spacing from one another at equal diameters, and is moreover provided with four circular pins 5 projecting from the surface of the drum, the axes of which lie in a plane perpendicular to the shaft 3 and intersect the axes of the cartridge chambers. The barrel 9 is inserted in the front wall 6 of the casing 1 and the guide pieces 55 (FIG. 3) fixed on the side walls thereof serve for mounting the weapon in the aircraft.

The belt feeder box joining the casing 1 on the rear is formed by the side walls 10 shown in FIG. 4 which are connected with the wall of this casing and directed rearward, the cover 11 and the rear wall 12, wherein the feeder shaft 13 is journalled which is rigidly connected to the shaft 3 of the drum. The feeder wheel 14 is pushed with two pairs of axially spaced star crowns 14a, 14b over the feeder shaft 13 and is keyed to the latter. Each of the star crowns has four recesses 15 arranged at regular angular spacing from one another (FIG. 4), i.e., as many recesses as the revolver drum 2 contains cartridge chambers, the centres of recesses lying behind one another being on straight lines aligned co-axially with the axes of the cartridge chambers each group of recesses aligned axially forming a guideway for the cartridges extending over the length of the set of feed wheels.

As shown in FIG. 2, the outer diameter of the forward portion of the hub of the feeder wheel 14, on which the pair of star crowns 14a is mounted, has a slightly larger diameter than the rearward adjoining portion with the pair of star crowns 14b. This difference of the hub radii corresponds to the gauge of the sheet metal of the belt link clamps. Between the two rear star crowns 14b moreover the hub cross section is substantially square (FIG. 4) the planes of symmetry passing through the faces of the square containing the centres of the four circular recesses 15 of each of the star crowns 14a, 14b. As follows moreover from FIG. 4 the distances of the faces of the square from the axis of the feeder shaft are smaller than those of the points of the recesses of the star crowns nearest to it. Thereby the resting of the forward and rear clamps 36 and 37 of the belt links 32 illustrated in FIG. 6 on the recesses of the star crowns 14b is assured, in that reinforcement ridges 35 projecting outward from the surface of the belt links find place in the depressions thus formed in the hub between the two star crowns 14b as shown in FIG. 1.

In the grooves 16 cut into the hub of the feeder wheel moreover spring biased locking pawls 17 are pivotally mounted between the two pairs of star crowns 14a, 14b the planes of movement of which coincide with the longitudinal middle planes of recesses of the star crowns lying one behind the other. The pawls protrude in the rest position beyond the outer hub diameter of the feeder wheel 14.

The strong rear wall 7 of the drum casing 1 is partly interrupted according to FIG. 3 and forms an abutment for those cartridges contained in the revolver drum which are in the "six o'clock position," i.e., in the firing position behind the barrel. From the "nine o'clock position" via the "twelve o'clock position" to the "three o'clock position" it is however possible to introduce cartridges through this aperture 18 into the cartridge chambers of the drum, or to withdraw them rearward from the same. As FIG. 3 shows, an ejector 20 for the cartridge cases is inserted into a slot of the rear wall 7 of the drum casing and is pivotally mounted on an axle 21. The ejector is designed as a two-armed lever, the arm 20a of which ends in a tongue 20d designed for engaging into the ejector groove of a cartridge case to be ejected, and the second arm 20b of which is provided with cams 20c, by means of which the movement of the ejector is controlled.

As shown in FIGS. 3 and 4, on guide tracks 23 fixedly connected to the cover 22 of the casing and to the cover 11 of the belt feeder box, two parts of the slide illustrated in FIG. 1 are mounted longitudinally movable, namely, the control slide 24 and the feeder slide 25. These slide components are connected to one another by means of coupling rods 26 and 27 attached to them by pins 28. The coupling rod 26 is provided with a groove into which the cam 20c of the ejector may engage. The control slide is subject to the bias of two closing springs 29 abutting the rear wall 12 of the casing, and is forced by them towards the forward terminal position illustrated in FIG. 1, in which its end face contacts the piston 30. This piston serves for driving the control slide 24 and accordingly also the feeder slide 25 in the sense of a rearward movement to a rear terminal position and is operated by the gases supplied from the barrel 9. Thus the slide 25 is reciprocated by a drive composed of the piston 30 and the springs 29.

In the control slide 24 there are machined, as shown, for example, in our copending patent application, No. 216,881, now Patent No. 2,998,757, control grooves 24a designed for engagement with the drum pins 5, in such a manner that upon its rearward stroke the drum 2 is turned, this drum when in motion then advancing the slide with the closing springs 29 again to the starting position. During such a full oscillation of the slide components 24 and 25 the drum turns 90°, i.e., the angle corresponding to the pitch of the cartridge casings.

On the guide piece 25a (FIG. 4) of the feeder slide sliding on the guide tracks 23 of the cover of the belt feeder box, a pusher web 25b is attached, which is curved substantially circular about the axis of the feeder wheel 14 and is designed at the front as a nose having a pusher face 25c (FIG. 10). The pusher web is moreover connected to the guide piece by the lateral wall 25d and by the walls 25e, 25f arranged transversely of the direction of movement of the slide, the rear wall 25f with its portion protruding downward beyond the pusher web 25b forming the rear pusher faces 25g of the feeder slide. The coupling rods 26 and 27 are attached by means of the pins 28 to lugs 25h connected to the frontal wall 25e.

To the side wall of the belt feeder box the ejector channel 19 for the spent cartridge cases is attached which is passed from the rear wall 7 of the drum casing rearward through the wall 12 of the casing, in the semi-circularly rounded wall 19a of which (FIG. 4) slots are provided for the passage of the arms of the star crowns 14a, 14b of the rotary feeder wheel. The axis of the rounded wall lies co-axially with a cartridge chamber of the drum 2 in the "nine o'clock position." Above this ejector channel 19, which is closed on top by a ceiling 47, the feeder channel 48 for the cartridge belt is arranged, which penetrates from a magazine not shown in the drawing into the feeder box, from the left and transversely of the direction of firing, and which in axial direction embraces the length of the set of feed wheels.

In FIG. 5 the means are illustrated, which are required for the guiding of the cartridge belt into this entrance channel. The cartridges are contained in the belt links 32 illustrated in FIG. 6, and are embraced by their clamps 36 and 37. The middle portion of the belt link, provided with a hook 33 and an eyelet lug 34, is provided with outward directed transverse ridges 35 extending over the circumference thereof. On the underside of the clamp 37 a stop face 38 extending in the feeding direction of the belt is pressed in, which runs out rearward into the same. On the ceiling 47 of the ejector channel serving as an inner guide surface 57 terminating in an end face 65 for the cartridge belt penetrating into the weapon a guide ledge 39 is attached, the upper face of which conforms with the outer contour of the belt links 32 and has a forward vertical guide face 40 (FIG. 5). The rear portion of the belt link 32 containing the cartridge P is supported by a narrow ledge 41 which is arranged parallel to this ledge 39 and accordingly at right angles to the axis of the weapon. The foot of the cartridge is guided by the rear wall 43 of the channel and by the ceiling 31 and moreover the neck of the cartridge case is guided along the ledge 42 mounted on the ceiling 31 of the channel and forming an outer guide surface for the ammunition belt which terminates in an end face 66. Of the two end faces 65, 66, which extend along the axis of the shaft 13, the end face 66 is offset relatively to the end face 65 in a direction opposite to the feed direction of the belt. Therefore a cartridge moving in the feed direction of the belt will reach an end position in the channel 48, which is shown in FIGURE 7, in which the cartridge is supported by the inner guide surface 57, while it is disengaged from the outer guide surface 31. In this end position the cartridge bottom will be caught by the pusher face 25g adjoining the end face 66 on the forward stroke of the slide 25. The guide components 39, 41 are inclined towards the hub of the feeder wheel 14 in such a manner that their slide faces are pointed approximately in the direction of a tangent to this hub.

Figure 8:
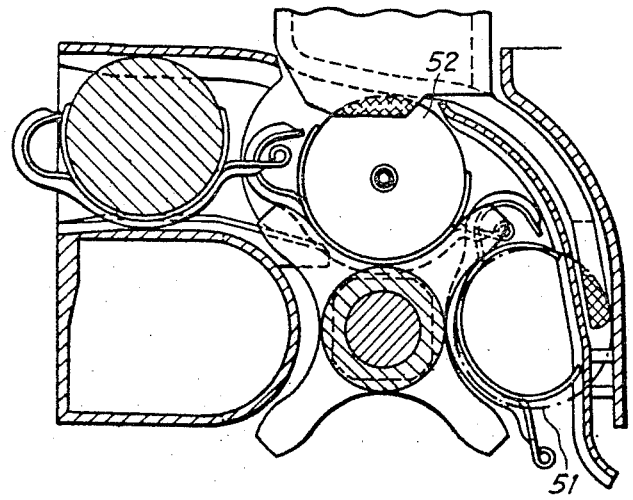
FIG. 8 is a section on the line VIII—VIII of FIG. 1, FIGS. 5 to 8 being on a larger scale.

According to the FIGS. 6, 7 and 8, the belt is formed in the usual manner in that the hook 33 of one belt link is hooked into the eyelet 34a of the lug 34 of the adjacent link. The torque of the feeder shaft is then transmitted by the star crowns 14b as a tensile force to the belt links and accordingly to the belt as a whole, when the arms contact the clamps 36 and 37 of the link.

In the front wall 44 of the belt entry channel 48, and accordingly also of the belt feeder box, an aperture 44a is provided in such a manner, that the cartridges partaking in the rotation of the feeder wheel 14 can pass through it and under the action of the feeder slide 25 through the same and the aperture 18 in the rear wall 7 of the drum casing. On the web 45 connected to the wall of the belt feeder box (FIG. 4) the guide web 46 is fixed, which serves for the deflection of the empty belt links and extends from the rear wall 43 of the feeder box right in front of the pair of star crowns 14b of the feeder shaft. Into the interstice formed between these two webs the pusher web 25b of the feeder slide 25 may enter at the rearward stroke thereof.

On the basis of this assembly the weapon may be operated as follows:

After the firing of the cartridge 49 shown in FIG. 1 in the "six o'clock position" in the revolver drum the two parts 24 and 25 of the slide are thrown back by the action of the piston 30. Up to the rear dead centre position of the slide the feeder wheel 14 has been turned in the clockwise sense half an angular distance of the cartridge chambers, i.e. 45°, owing to the rotation of the drum 2, from the firing position illustrated, for example, in FIGS. 4 and 8 to an intermediate position shown in FIG. 7, and thereby the belt has been pulled out of the feeder channel 48 a stretch corresponding to half the spacing of two adjacent links of the belt. In FIG. 2 the moment has been shown at which the components of the slide after their rear dead centre position have advanced again a short stretch s and the rear pusher face 25g of the feeder slide 25 abuts the bottom of the cartridge 52 which has been turned into its path. The position of this cartridge 52 relative to the feeder wheel 14 and to the cartridge chamber into which it is to be inserted, is shown in FIG. 7. In this figure the axis of the cartridge is indicated by a double circle, while the position of the axis of the cartridge chamber is indicated by one small circle. Simultaneously with the rear pusher face 25g also the forward pusher face 25c comes into contact with the cartridge 51, which in FIGS. 7 and 8 is shown in chain-dotted lines, and after the preceding firing has already been partly introduced (FIG. 1) into a cartridge chamber of the drum. The effective portions of the pusher faces 25g and 25c of the slide are cross-hatched in these FIGS. 7 and 8.

During the subsequent ejection of the cartridge 52 from the clamps 36 and 37 of the belt link 32 the latter is guided transversely of its direction of expulsion, i.e., transversely of the axes of the weapon, while the belt is in movement at the same time. Thereby said link is restrained from moving forward or from a deviation of its axis from a direction parallel to the axis of the weapon, which might cause the projectile to miss the opening of the cartridge chamber, in that the forward edge of its eyelet lug 34 abuts the rear face of the arm 14b' of the star crown 14b (FIGS. 2 and 7), and the forward edge of the ridge 38 is guided along the face 40 of the ledge 39 (FIG. 5). During this movement from the position illustrated in FIG. 7 into the position shown in FIG. 8 the cartridge 52 is moreover guided along the inner face of the pusher web 25b and, after the cartridge 52 has been completely expelled from the belt link, is guided into the recesses of the forward pair of star crowns 14a. At the end of the forward stroke of the slide components 24 and 25 the cartridge 52 has reached the position shown in the FIGS. 1 and 8, and is secured by the pawls 17 against a rearward movement. The cartridge 51, on the other hand, has then been completely introduced into the drum, and in the cartridge chamber of the latter lying co-axially with the barrel there is again a cartridge ready to be fired.

During the rotation of the drum the spent case of the cartridge 49 just fired has been turned from the "six o'clock position" into the "nine o'clock position" illustrated in FIG. 3, so that the tongue 20d of the ejector engages into the ejector groove of the cartridge case. In the FIGS. 1 and 3 such a cartridge case engaged by the ejector is denoted 49'. In the last part of the forward stroke of the slide, during which at any time one of the pins 5 of the drum moves in a straight portion parallel to the axis of the control groove 24a of the control slide 24, and the drum is accordingly at a standstill, the ejector is swung by the coupling rod 26 into the position shown in FIG. 1, and thereby the cartridge case is ejected rearward through the opening 18 in the rear wall 7 of the drum casing and through the ejector channel 19 adjoining this wall 7. At the beginning of the rearward movement of the slide starting at the next firing the ejector is guided back into the starting position by the coupling rod.

As shown in FIG. 2, at the beginning of the pushing out of a belt link of a cartridge the tip of the projectile is located only slightly behind the rear wall 7 of the drum casing. At the forward movement of the cartridge the body 52a of the projectile penetrates firstly through the aperture 18 in the wall 7 forming part of an annular circle. The middle circle of this aperture lies on the cylindrical surface described by the axes of the cartridge chambers. Although the axis of the cartridge according to FIG. 7 does not intersect this middle circle at the beginning of the forward stroke, but lies at a larger distance away from the axis of the drum or feeder wheel, the movement of the cartridge is not hampered thereby since the diameter of the projectile body is smaller than the width of the annular opening 18 measured in the radial direction which corresponds to the largest diameter of the cartridge case. The guide ledge 39 forming the slide face for the belt, and particularly for the belt link containing the cartridge to be inserted, is so arranged and inclined, that a belt link with the cartridge held in it lies already almost in the recess of the star crowns 14b and the axis of the cartridge is accordingly almost aligned co-axially with the associated cartridge chamber, when the tip of the projectile has reached the rear face of the drum. By this measure and by the supporting of the belt link up to this moment preventing a turning away of the cartridges, the centered insertion into the cartridge chambers of the cartridges is made possible during their continued advance.

In the drawings, FIGS. 1 to 8, an embodiment with feed of the cartridge belt towards the drum from the left hand side is illustrated. The loading device according to the invention is obviously applicable also to the feed of the belt from the right hand side. In this case when the cartridge is being pushed out the belt link is supported against the forward star crown 14b by the forward edge 33a of the hook extension 38 lying on the same level as the edge of the eye lug 34. The applicability of this loading device is likewise possible in the appropriate sense with a slide lying below and with the feeder channel issuing from the right or the left.

In the FIGS. 9 to 12 moreover the feeder operation is illustrated, of a device according to the invention serving for feeding cartridges into the revolver drum which are not conveyed in belt links but, under the action of a force F directed transversely of the axis of the weapon, are conveyed through the feeder channel and into the recesses of the star crowns. In this device accordingly those ledges and deflector webs serving for the guiding and support of the belt links are dispensed with, as illustrated in the FIGS. 4 and 5 and denoted 39, 41 and 46.

With this embodiment for unbelted cartridges of the feeder device according to the invention there results a sequence of the feeder operations for the cartridges into the revolver drum, which to a large extent is identical with the sequence described hereinabove for belted cartridges. When the pusher face 25g of the feeder slide 25 after the rear dead centre position thereof abuts the bottom of the cartridge 58, which is still guided on the guide web 57 of the feeder channel 48 and contacts the star crowns of the feeder wheel 14, the axis thereof indicated by a circle is not yet aligned co-axially with the axis marked by a cross of the cartridge case 59. At the continued advance of the cartridge the tip of the projectile reaches the level of the rear face 2a of the drum 2. During this movement and the simultaneous rotation of the feeder wheel the approaching of the axes of the cartridge and of the cartridge chamber to one another takes place, so that the cartridges 58, as shown in FIG. 11, lies almost completely in the recesses of the star crowns 14a, 14b of the feeder wheel and co-axially with the cartridge chamber 59. At the remainder of the advance of the feeder slide the cartridge 58 may accordingly be guided centrally into the cartridge chamber. In the FIGS. 10 and 12 it has been illustrated moreover, in a manner applicable likewise to the feed of belted cartridges, how the cartridge 60 introduced already into the cartridge chamber 61 during a first stroke of the feeder slide is pushed further in a second stroke by the pusher face 25c of the nose 25b of the slide, and is finally completely inserted into the cartridge chamber.

While I have herein described and illustrated in the accompanying drawings what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent, is:

1. In a loading device for an automatic firearm the combination comprising a casing extending along a longitudinal axis, a cartridge magazine rotatably journaled in said casing for rotation about said axis, said magazine comprising a drum containing a plurality of cartridge chambers, and being provided with a number of firing positions, said number being equal to said plurality of cartridge chambers, two each of the latter being angularly distant by a constant angular spacing, said magazine further comprising a set of axially spaced star-shaped feed wheels, the latter having recesses coaxial with said cartridge chambers; a cartridge feeder channel directed transversely of said axis to guide the cartridges in a feeding direction towards said set of feed wheels, the said channel being provided with inner and outer guide surfaces for said cartridges, said guide surfaces axially extending substantially over the length of said set of feed wheels, said inner surface further extending into the range of said feed wheels and each of said guide surfaces being provided with an end face extending along said axis, the end face of said outer guide surface being offset relatively to the end face of said inner guide surface in a direction opposite to said feeding direction to provide for an end position for said cartridges in said channel, in which end position a cartridge is supported by said inner guide surface and is disengaged from the said outer guide surface; a feeder slide slidably supported in said casing for reciprocating movement along said axis between rear and forward terminal positions, said slide being provided with a pusher face adjoining the end face of said outer guiding surface to engage a cartridge reaching said end position and to move the cartridge towards said drum; driving means engaging said magazine and said slide to move the latter out of said forward terminal position to said rear terminal position and to simultaneously rotate said magazine through one half of said angular spacing out of one of said firing positions to an intermediate position, in which latter a cartridge upon being located in said end position extends into a recess of each of said feed wheels.

2. In a loading device for an automatic firearm the combination comprising a casing extending along a longitudinal axis; an ammunition belt including cartridges and links, each link having clamps to frictionally hold said cartridges, each link being further provided with a stop face extending along a feeding direction for said ammunition belt; a cartridge magazine rotatably journaled in said casing for rotation about said axis, said magazine comprising a set of star shaped feed wheels, the latter having recesses to form a plurality of cartridge guideways extending parallel to said axis; a feeder channel directed transversely of said axis and carrying said ammunition belt to guide the cartridges in said feeding direction towards said feed wheels, said channel being provided with inner and outer guide surfaces for said belt, said guide surfaces extending axially substantially over the length of said set of feed wheels, said inner guide surface further extending into the range of said feed wheels and being provided with a ledge extending in said feeding direction to coact with said stop face, each of said guide surfaces being further provided with an end face extending along said axis, the end face of said outer guide surface being offset relatively to the end face of said inner guide surface in a direction opposite to said feeding direction to provide for an end position for said links in said channel, in which end position a link is supported by said inner guide surface while the cartridge supported by the last named link is disengaged from said outer guide surface, a feeder slide reciprocable along said axis, said slide being provided with a pusher face adjoining the end face of said outer guiding surface, to engage a cartridge supported by a link reaching said end position and to move said cartridge out of said last named link, the latter being held against movement along said axis by said ledge.

References Cited in the file of this patent

UNITED STATES PATENTS

| | | |
|---|---|---|
| 2,800,056 | Atherton | July 23, 1957 |
| 2,820,400 | O'Brien | Jan. 21, 1958 |